US012212123B2

(12) United States Patent
Son et al.

(10) Patent No.: US 12,212,123 B2
(45) Date of Patent: Jan. 28, 2025

(54) ION GENERATOR INCLUDING HOLDER KIT

(71) Applicant: LG Electronics Inc., Seoul (KR)

(72) Inventors: Soowang Son, Seoul (KR); Sujin Lee, Seoul (KR); Bongjo Sung, Seoul (KR); Ilna Son, Seoul (KR); Hyoseok Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 224 days.

(21) Appl. No.: 17/802,043

(22) PCT Filed: Feb. 25, 2021

(86) PCT No.: PCT/KR2021/002353
§ 371 (c)(1),
(2) Date: Aug. 24, 2022

(87) PCT Pub. No.: WO2021/172883
PCT Pub. Date: Sep. 2, 2021

(65) Prior Publication Data

US 2023/0093679 A1 Mar. 23, 2023

(30) Foreign Application Priority Data

Feb. 25, 2020 (KR) ........................ 10-2020-0023193

(51) Int. Cl.
*H01T 23/00* (2006.01)
*H01T 19/04* (2006.01)

(52) U.S. Cl.
CPC ............ *H01T 23/00* (2013.01); *H01T 19/04* (2013.01)

(58) Field of Classification Search
CPC ......... A61L 9/22; B03C 2201/06; B03C 3/38; B03C 3/40; B03C 3/41; B03C 3/74;
(Continued)

(56) References Cited

U.S. PATENT DOCUMENTS 7,948,733 B2 * 5/2011 Hashimoto ............. H01T 23/00 361/230
2009/0052108 A1 * 2/2009 Innami .................... H01T 19/04 361/220
2016/0218490 A1 * 7/2016 Nishida ..................... A61L 9/22

FOREIGN PATENT DOCUMENTS

JP 2002184595 A * 6/2002
JP 2007305417 11/2007
(Continued)

*Primary Examiner* — Jared Fureman
*Assistant Examiner* — Nicolas Bellido
(74) *Attorney, Agent, or Firm* — Fish & Richardson P.C.

(57) ABSTRACT

An ion generator includes a circuit board through which a high voltage flows; a high-voltage electrode to which a high voltage is applied through contact with the circuit; a ground electrode grounded through contact with the circuit and spaced apart from the high-voltage electrode; and a holder kit in which a first insertion groove, into which the high-voltage electrode is inserted, and a second insertion groove, which is spaced apart from the first insertion groove and into which the ground electrode is inserted, are formed in the vertical direction, and thus a stable uniform electric field can be continuously formed through the integration of the high-voltage electrode and the ground electrode by using the holder kit, so that the lifespan of an electrode can be improved and the occurrence of discharge noise can be suppressed.

20 Claims, 11 Drawing Sheets

(58) Field of Classification Search
CPC .................. B03C 3/743; B60H 3/0071; B65H 2301/5133; C01B 13/11; C02F 1/4608; F24F 7/00; F24F 2003/1682; F24F 3/166; G03G 15/0291; H01J 27/02; H01J 27/22; H01J 27/26; H01J 37/08; H01L 27/26; H01T 19/04; H01T 23/00; H01T 19/00; H01T 19/02; H05F 3/04; H05H 2001/481; Y10T 29/49002
See application file for complete search history.

(56) References Cited

FOREIGN PATENT DOCUMENTS

| | | | | |
|---|---|---|---|---|
| JP | 2009104972 | | | 5/2009 |
| JP | 2009104972 | A | * | 5/2009 |
| JP | 4386376 | B2 | * | 12/2009 |
| JP | 2011018477 | | | 1/2011 |
| JP | 2011018616 | | | 1/2011 |
| JP | 2013225383 | A | * | 10/2013 |
| JP | 2016536760 | | | 11/2016 |

* cited by examiner (a)

(b)

(a)

(b)

(a)

(b)

(c)

ION GENERATOR INCLUDING HOLDER KIT

CROSS-REFERENCE TO RELATED APPLICATIONS

This application is a National Stage application under 35 U.S.C. § 371 of International Application No. PCT/KR2021/002353, filed on Feb. 25, 2021, which claims the benefit of Korean Patent Application No. 10-2020-0023193, filed on Feb. 25, 2020. The disclosures of the prior applications are incorporated by reference in their entirety.

TECHNICAL FIELD

The present disclosure relates to an ion generator, and more particularly, to a holder kit into which an electrode is inserted.

BACKGROUND ART

An ion generator is a device that is applied to an air conditioner, an air purifier, a sterilizer, and the like and produces ions to remove bacteria or odor-causing molecules in the air.

In this ion generator, a discharge electrode and an induction electrode are disposed to produce ions, and a uniform electric field is formed between the discharge electrode and the induction electrode, so that when a high voltage is applied, a corona discharge occurs, causing the surrounding (air) molecules to ionize.

However, in the ionization process, the induction electrode may not be properly fixed, which causes a difficulty in producing a uniform electric field. As a result, problems, such as the generation of a large amount of ozone, reduction in lifespan caused by abrasion of an end portion of an electrode, and an increase in discharge noise, occur.

Patent Registration No. 10-1027611 (hereinafter also referred to as 'Related Art Document 1'), which is hereby incorporated by reference, discloses an ion generator capable of integrally fixing an induction electrode to a circuit board. As for the Related Art Document 1, a uniform electric field can be maintained as the induction electrode is integrally fixed to the circuit board. However, high integration through integration with a discharge electrode cannot be achieved.

Laid-Open Patent Publication No. 10-2011-0050473 (hereinafter also referred to as 'Related Art Document 2'), which is hereby incorporated by reference, discloses an ion generator, which goes further from the Related Art Document 1, including a discharge electrode having a needle-shaped tip portion and an induction electrode having a circular through-hole through which the discharge electrode passes. As for the Related Art Document 2, in order to improve the efficiency of ion emission, the tip portion of the discharge electrode is disposed to protrude upward relative to an upper surface of the induction electrode. However, this only increases the ionization efficiency by changing an arrangement structure of the discharge electrode and the induction electrode, the problems described above cannot be addressed.

DISCLOSURE OF INVENTION

Technical Problem

It is an objective of the present disclosure to provide an ion generator that can produce a stable uniform electric field through the integration of a high voltage electrode and a ground electrode.

It is another objective of the present disclosure to provide an ion generator including a highly integrated high voltage circuit therein.

It is yet another objective of the present disclosure to provide an ion generator with the maximized efficiency of ion generation through the optimization of an ion generator design specification.

The objectives of the present disclosure are not limited to the objectives described above, and other objectives not stated herein will be clearly understood by those skilled in the art from the following description.

Technical Solution

According to an aspect of the subject matter described in this application, an ion generator includes: a circuit board through which a high voltage flows; a high voltage electrode with a needle shape, the high voltage electrode being in contact with a circuit to allow the high voltage to be applied thereto; a ground electrode grounded through contact with the circuit and spaced apart from the high voltage electrode; and a holder kit including a first insertion groove into which the high voltage electrode is inserted, and a second insertion groove spaced apart from the first insertion groove, into which the ground electrode is inserted, and formed vertically.

The holder kit may include a flat surface having a through-hole therein, and the first insertion groove may extend downward from the through-hole.

The high voltage electrode may be in contact with a peripheral portion of the first insertion groove.

The holder kit may include an inclined surface inclined upward from the flat surface toward an outside, and the inclined surface may be provided therein with a space.

The ground electrode may include: a support portion inserted into the circuit board; and an electrode portion with an arcuate shape extending from an upper end of the support portion. The support portion may be inserted into the second insertion groove.

The holder kit may include a rim having a ring shape, and the electrode portion may be in contact with an inner circumferential surface of the rim.

The holder kit may include a seating surface that extends inward from a lower portion of the rim, and the electrode portion may be in contact with the seating surface.

The rim may have a ring shape with a gap, and the second insertion groove may extend downward from the gap.

The electrode portion may be symmetrical with respect to the support portion.

A height of the electrode portion and a height of the high voltage electrode may be the same.

An upper end of the high voltage electrode may be located between a position 1 mm higher than an upper surface of the electrode portion and a position 0.5 mm lower than the upper surface of the electrode portion.

The high voltage electrode may include a tip portion defining an upper end thereof, and the tip portion may be disposed at a center of the electrode portion.

A diameter of the tip portion may be greater than or equal to 7 μm and less than or equal to 13 μm.

A distance between the tip portion and the electrode portion may be greater than or equal to 8 mm and less than or equal to 10 mm.

The circuit may include: a high voltage transformer configured to boost a voltage applied; a high voltage pattern through which a high voltage is applied; and a ground pattern grounding the circuit. The high voltage pattern and the ground pattern may be printed on the circuit board.

The high voltage pattern may be printed on a lower surface of the circuit board, and the ground pattern may be printed on an upper surface of the circuit board.

The ground pattern may include: a first ground pattern printed on the upper surface of the circuit board; and a second ground pattern printed on an upper side of the first ground pattern.

Details of other embodiments are included in the detailed description and the accompanying drawings.

Advantageous Effects

An ion generator according to the present disclosure has one or more of the following effects.

First, a stable and uniform electric field may be continuously formed through the integration of a high voltage electrode and a ground electrode, thereby increasing the lifespan of an electrode and suppressing the occurrence of discharge noise.

Second, the ion generation efficiency may be maximized through an optimized design of an electrode integrated module, thereby reducing the amount of ozone generated during the ionization process.

Third, as a circuit pattern for applying a high voltage to a high voltage electrode is printed on a circuit board, poor contact of the high voltage electrode may be prevented, and a cost reduction may be achieved through high integration.

The effects of the present disclosure are not limited to the effects described above, and other effects not mentioned will be clearly understood by those skilled in the art from the claims.

Figure 2:
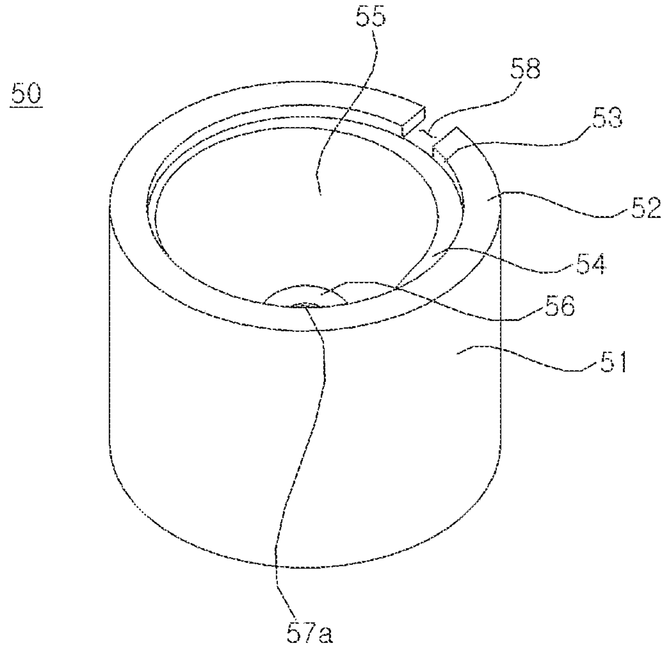
Figure 2:
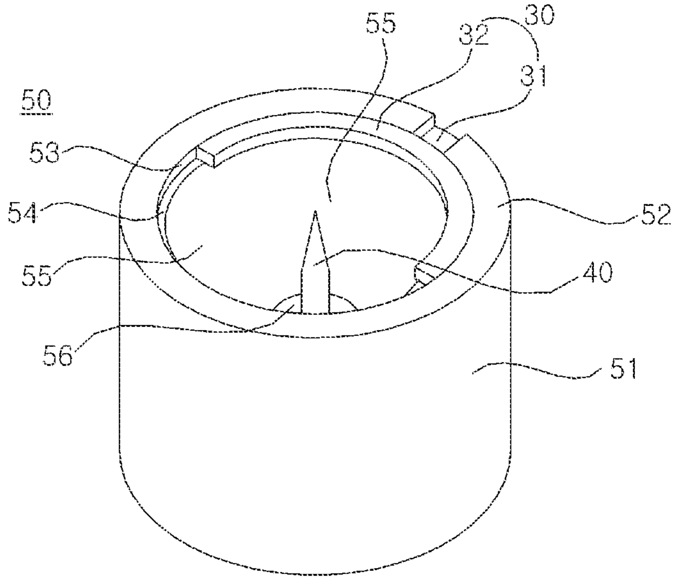

(a) of FIG. 2 is a perspective view of a holder kit according to an embodiment of the present disclosure.

(b) of FIG. 2 is a perspective view of a holder kit into which an electrode is inserted, according to an embodiment of the present disclosure.

Figure 3:
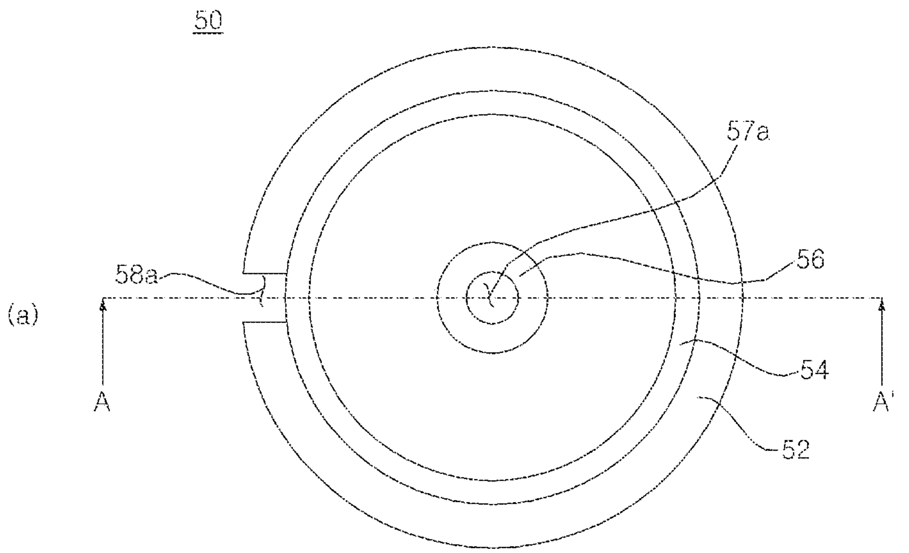
Figure 3:
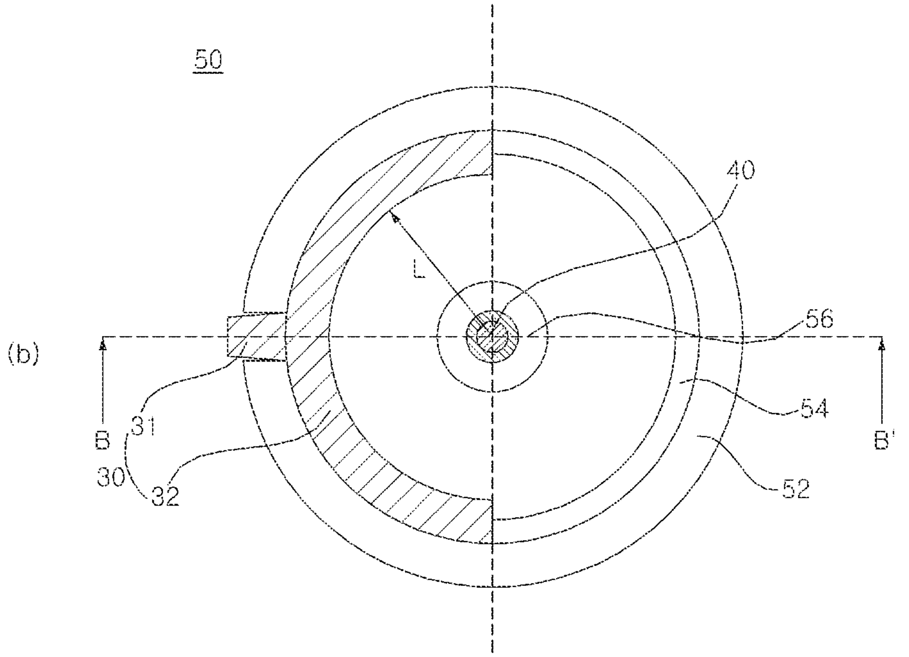

(a) of FIG. 3 is a top perspective view of (a) of FIG. 2.

(b) of FIG. 3 is a top perspective view of (b) of FIG. 2.

Figure 4:
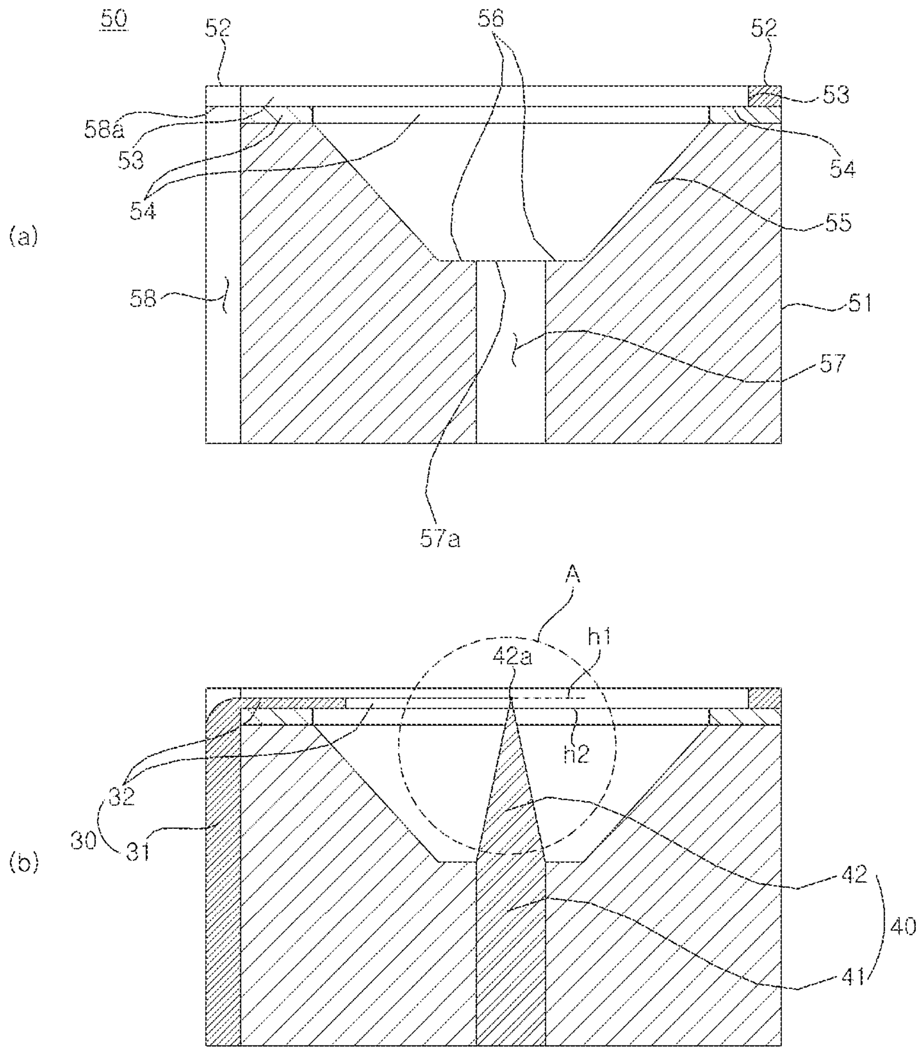

(a) of FIG. 4 is a cross-sectional view taken along the line A-A' of (a) of FIG. 3.

(b) of FIG. 4 is a cross-sectional view taken along the line B-B' of (b) of FIG. 3.

Figure 5:
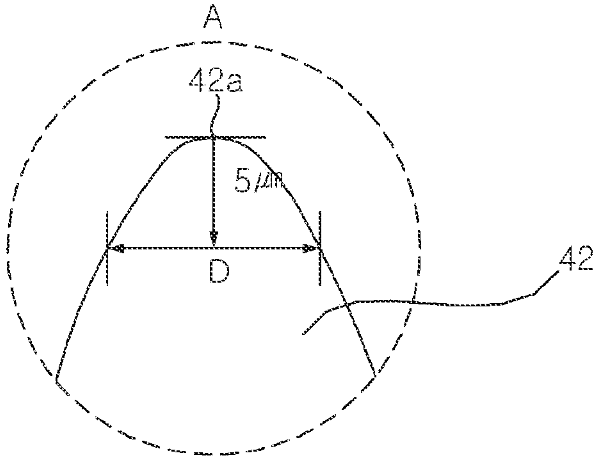
Figure 5:
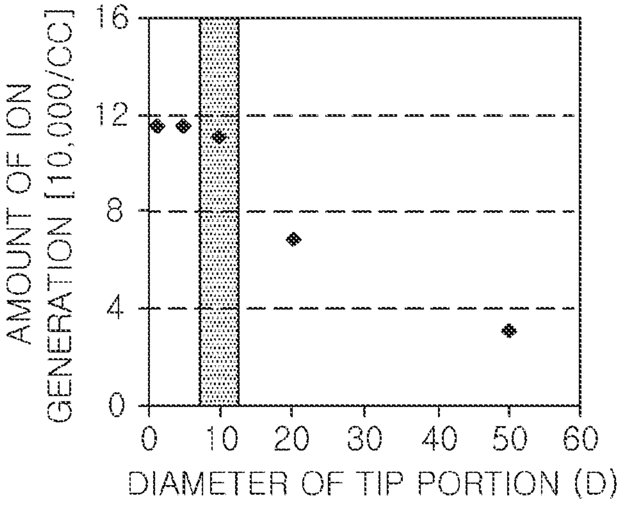

FIG. 5 illustrates the design of a tip portion and its effect, according to an embodiment of the present disclosure.

Figure 6:
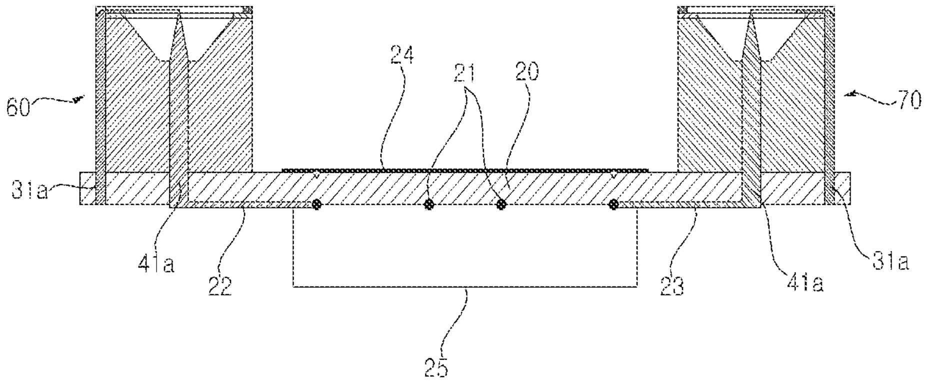

FIG. 6 illustrates a portion of a longitudinal cross-sectional view of an ion generator according to an embodiment of the present disclosure.

Figure 7:
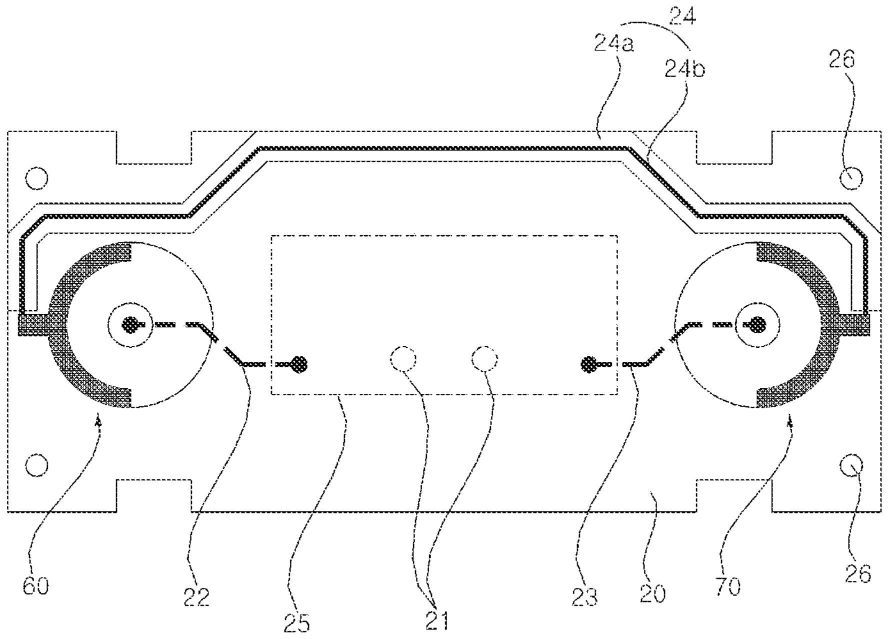

FIG. 7 is a schematic top perspective view of an ion generator according to an embodiment of the present disclosure.

Figure 8:
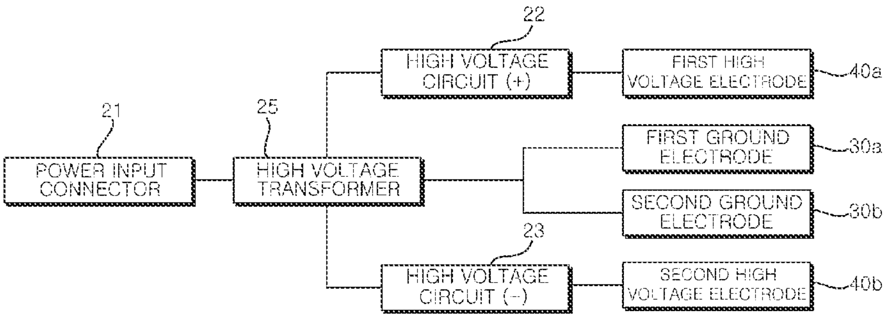

FIG. 8 is a block diagram of an ion generator according to an embodiment of the present disclosure.

Figure 9:
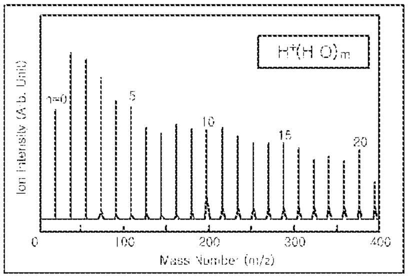
Figure 9:
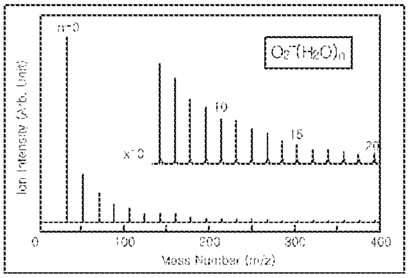
Figure 9:
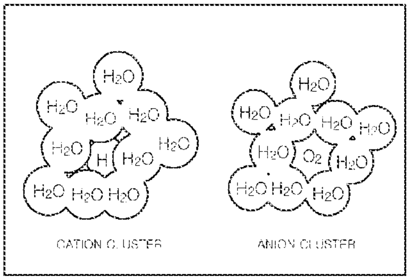

FIG. 9 illustrates the principle of an ion generator according to an embodiment of the present disclosure.

Figure 10:
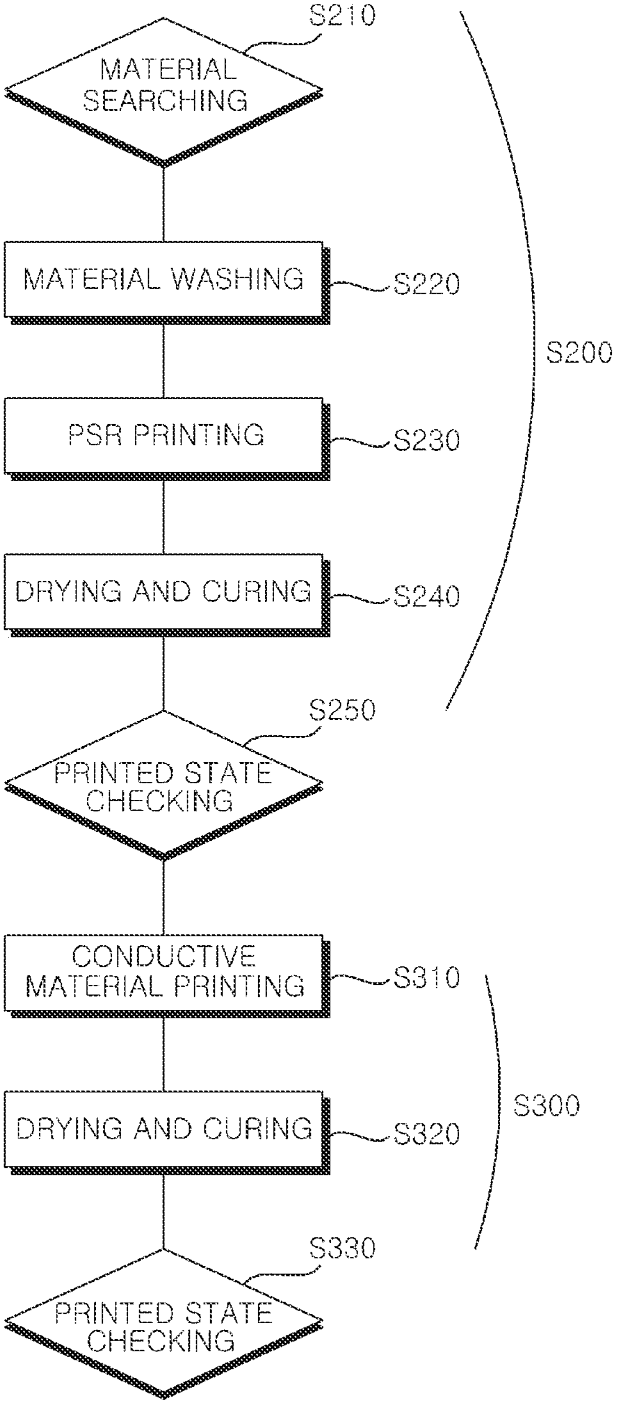

FIG. 10 is a block diagram illustrating a manufacturing process of a circuit board according to an embodiment of the present disclosure.

Figure 11:
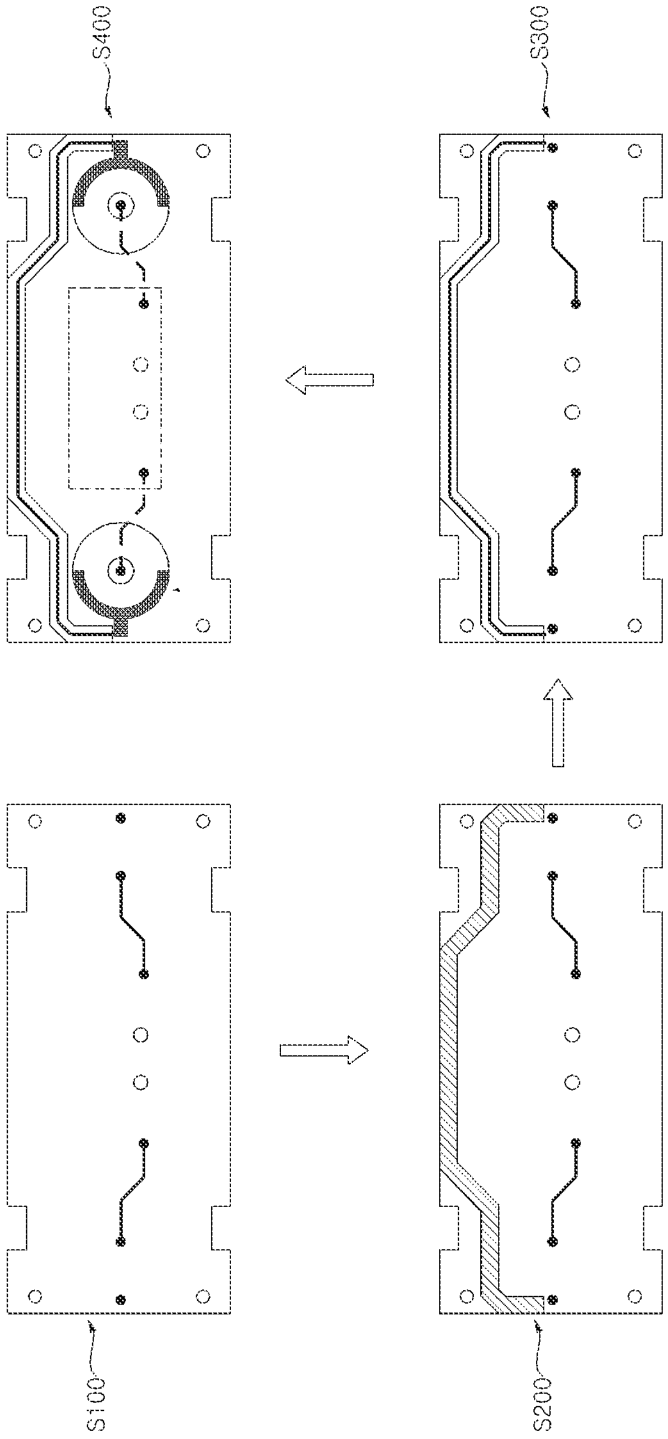

FIG. 11 illustrates a manufacturing process of a circuit board according to an embodiment of the present disclosure.

Figure 12:
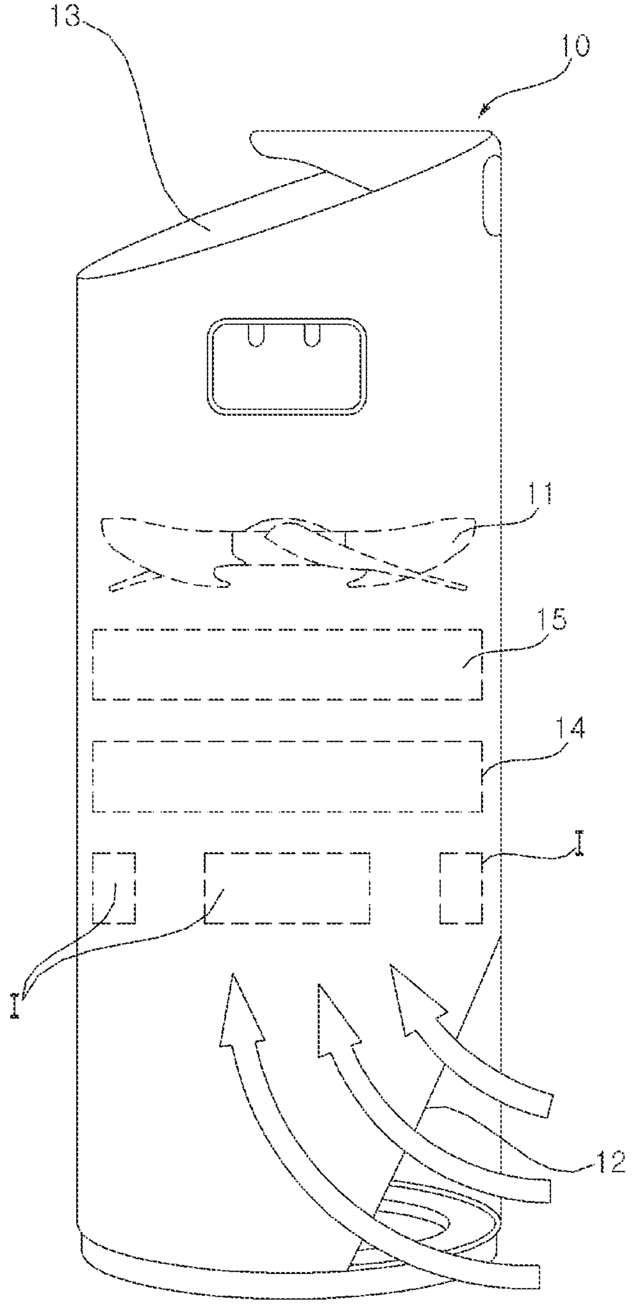

FIG. 12 is a schematic diagram of an air conditioner including an ion generator according to an embodiment of the present disclosure.

MODE FOR INVENTION

The above and other aspects, features and other advantages of the present disclosure will be more clearly understood from the following detailed description taken in conjunction with the accompanying drawings. Exemplary embodiments will now be described more fully hereinafter with reference to the accompanying drawings; however, they may be embodied in many different forms and should not be construed as limited to the embodiments set forth herein. Rather, these embodiments are provided so that this disclosure will be thorough and complete, and will fully convey the scope of the exemplary embodiments to those skilled in the art. The same reference numerals are used throughout the drawings to designate the same or similar components.

Hereinafter, an ion generator I according to embodiments of the present disclosure will be described with reference to the accompanying drawings.

Figure 1:
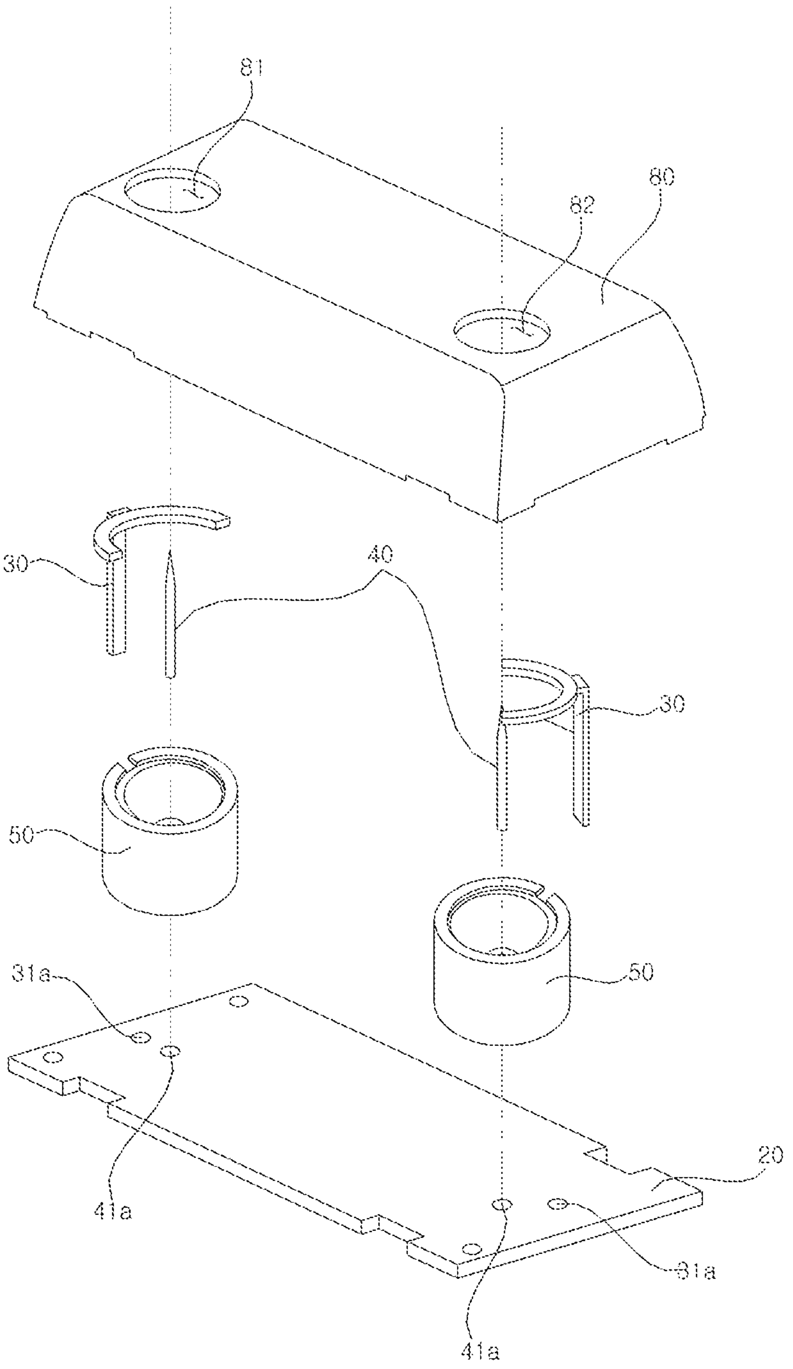
FIG. 1 is an exploded perspective view of an ion generator according to an embodiment of the present disclosure.

Referring to FIG. 1, the ion generator I according to the present disclosure includes a high-voltage or high voltage electrode 40 to which a high voltage is applied, a ground electrode 30 spaced apart from the high voltage electrode 40, and a holder kit 50 into which the high voltage electrode 40 and the ground electrode 30 are inserted. The ion generator I may include a circuit board 20 on which the high voltage electrode 40 and the ground electrode 30 are installed, and a case 80 that defines an outer appearance of the ion generator I.

A positive (+) high voltage or a negative (−) high voltage is applied to the high voltage electrode 40, and ground is provided to the ground electrode 30. When a high voltage is applied to the high voltage electrode 40, a plasma discharge (also referred to as a 'corona discharge') is generated from the high voltage electrode 40 toward the ground electrode 30.

When assembling the ion generator I, the ground electrode 30 and the high voltage electrode 40 may be inserted into different portions of the holder kit 50 to be integrally coupled to each other.

An integrally coupled assembly may be coupled to the circuit board 20. Here, an end of the ground electrode 30 may be inserted into a ground electrode insertion hole 31*a* formed in the circuit board 20, and an end of the high voltage electrode 40 may be inserted into a high voltage electrode insertion hole 41*a* formed in the circuit board 20.

The case 80 defining the outer appearance of the ion generator I may cover the circuit board 20 and the assembly, and a plurality of communication holes 81 and 82 may be formed in the case 80 to allow molecules contained in air flowing outside the ion generator I to be ionized when the ion generator I is driven.

Hereinafter, a structure of the holder kit 50 according to an embodiment of the present disclosure will be described in detail with reference to FIGS. 2, 3 and 4.

FIG. 2 is a perspective view of the holder kit 50, FIG. 3 is a top perspective view of the holder kit 50, and FIG. 4 is a cross-sectional view of the holder kit 50.

In FIGS. 2, 3 and 4, (a) of each figure shows a state before the insertion of the ground electrode 30 and the high voltage electrode 40, and (b) of each figure shows a state after the insertion of the ground electrode 30 and the high voltage electrode 40.

Referring to FIG. 2, an overall shape of the holder kit 50 may be cylindrical, and the holder kit 50 may be provided therein with an empty space.

The holder kit 50 may include an outer circumferential wall 51 that defines an outer shape, and the outer circumferential wall 51 may have a predetermined thickness to define an outer edge surface of the holder kit 50.

A rim 52 that extends toward an inside of the holder kit 50 by the thickness of the outer circumferential wall 51 may be provided on the outer circumferential wall 51, and the rim 52 may have an annular or ring shape. In addition, the rim 52 may extend parallel to a bottom surface of the holder kit 50.

The rim 52 may be provided with a gap 58*a* formed by cutting a portion thereof to define a groove into which the ground electrode 30 is inserted, and the gap 58*a* may not only be a planar conception formed on the rim 52, but may also be a spatial conception spread downward from the rim 52 along the outer circumferential wall 51. The gap 58*a* may be formed vertically along the outer circumferential wall 51 to provide a groove into which the ground electrode 30 is inserted.

The rim 52 may form, together with an upper surface of an electrode portion 32 of the ground electrode 30*a*, a continuous surface when the ground electrode 30 is coupled to the holder kit 50.

An inner circumferential surface 53 may be a portion of an inner edge surface of the outer circumferential wall 51, and may refer to an inner surface of the rim 52. The inner circumferential surface 53 may serve as a damper that prevents the ground electrode 30 from shaking when the ground electrode 30 is coupled to the holder kit 50, and an inner diameter defined by the inner circumferential surface 53 may be equal to an outer diameter of the ground electrode 30 or may have a predetermined tolerance.

A seating surface 54 may be formed at a lower end of the inner circumferential surface 53, and the seating surface 54 may extend from an end of the inner circumferential surface 53 to be parallel with the bottom surface of the holder kit 50.

The seating surface 54 may be understood as an annular rim protruding inward from the inner edge surface of the outer circumferential wall 51, and may function or serve as a seating portion that allows the ground electrode 30 to be securely mounted without hanging loose downward when the ground electrode 30 is coupled to the holder kit 50.

An outer diameter defined by the seating surface 54 may be equal to an outer diameter of the electrode portion 32 of the ground electrode 30 or may have a predetermined tolerance, and an inner diameter defined by the seating surface 54 may be greater than an inner diameter of the electrode portion 32.

An inclined surface 55 may be formed at an end of the seating surface 54, and an overall shape of the inclined surface 55 may be a conical shape or a funnel shape.

The inclined surface 55 may have an inclination angle toward a lower side of the inside of the holder kit 50, and may have an inner diameter that gradually decreases downward.

An inner space surrounded by the inclined surface 55 may be formed in the holder kit 50. When a high voltage is applied by coupling the ground electrode 30 and the high voltage electrode 40 to the holder kit 50, a uniform electric field may be produced in the inner space.

A flat surface 56 may be formed at a lower end portion of the inclined surface 55, and the flat surface 56 may extend from a lower end of the inclined surface 55 to be parallel to the bottom surface of the holder kit 50.

An overall shape of the flat surface 56 may be an annular or ring shape, and the flat surface 56 may include a through-hole 57*a* through which the high voltage electrode 40 passes.

The through-hole 57*a* may be concentric with the flat surface 56, and an outer diameter of the through-hole 57*a* may be equal to an outer diameter of the high voltage electrode 40 or may have a predetermined tolerance.

The ground electrode 30 may consist of a support portion 31 vertically inserted into the circuit board 20 to support weight or load of the ground electrode 30, and the electrode portion 32 extending from an upper end of the support portion 31 in a direction parallel to the circuit board 20.

The support portion 31 may have a bar shape, and may be inserted into a second insertion groove 58 formed in the outer circumferential wall 51.

The electrode portion 32 may have a semicircular ring shape, and may be inserted into the holder kit 50 with being seated on the seating surface 54 and being in close contact with the inner circumferential surface 53.

The high voltage electrode 40 may consist of a body portion 41 vertically inserted into the circuit board 20 to protrude upward, and a tip portion 42 formed on the body portion 41 in a needle shape.

A diameter of the body portion 41 may be constant in an up-and-down direction, and a diameter of the tip portion 42 may gradually decrease upward.

The high voltage electrode 40 may be inserted into the holder kit 50 to pass through the through-hole 57*a*, and may be divided into the body portion 41 and the tip portion 41 by the through-hole 57*a* serving as a boundary.

Referring to FIG. 3, when the holder kit 50 is viewed from above, boundaries defined by boundary surfaces 51, 52, 53, 54, 55, and 56 of the holder kit 50 may be concentric with each other.

In description with reference to FIG. 3, a hatched region shown in FIG. 3 does not indicate a cross-section processed, and this is to clearly divide or distinguish configurations of the ground electrode 30, the high voltage electrode 40, and the holder kit 50.

When the support portion 31 of the ground electrode 30 is inserted into the holder kit 50, the support portion 31 may have a region protruding from the outer circumferential wall 51.

The line A-A' indicating a cross-section and the line B-B' indicating a cross-section to be described later with reference to FIG. 4 may pass through a center of the holder kit 50, and therefore, each of the cross-sections may be defined as a 'central cut surface'.

The electrode portion 32 of the ground electrode 30 may be inserted into the holder kit 50 to be symmetrical with respect to the central cut surface, and this may also be expressed that the electrode portion 32 is divided into equal parts by the central cut surface.

In more detail, an area of the electrode portion 32 located on an upper side with respect to the central cut surface and an area of the electrode portion 32 located on a lower side with respect to the central cut surface may be the same, and the electrode portion 32 located on the upper side and the electrode portion 32 located on the lower side may draw a trajectory in all four quadrants. Accordingly, when a line perpendicular to the central cut surface is drawn, the line may pass through both ends of the electrode portion 32.

A distance L from the high voltage electrode 40 to the ground electrode 30 may be in the range greater than or equal to 8 mm and less than or equal to 10 mm, and may preferably be 9 mm.

The distance L may be formed equally throughout the entire portion of the electrode portion 32, and accordingly, the high voltage electrode 40 and the electrode portion 32 of the ground electrode 30 may be concentric with each other when the high voltage electrode 40 and the electrode portion 32 are inserted into the holder kit 50.

Referring to FIG. 4, a cross-sectional shape of the holder kit 50 cut along the central cut surface is illustrated.

A first insertion groove 57 into which the high voltage electrode 40 is inserted may be formed in a center of FIG. 4, and the second insertion groove 58 into which the ground electrode 30 is inserted may be formed on a left side of FIG. 4.

The first insertion groove 57 may be open downward from the through-hole 57*a*, and may be open to a lower surface of the holder kit 50.

The second insertion groove 58 may be open downward from the gap 58*a*, and may be open to the lower surface of the holder kit 50.

The first insertion groove 57 may have an open cylindrical shape, and the high voltage electrode 40 may be divided into the body portion 41 and the tip portion 42 by the through-hole 57*a* serving as a boundary.

When the support portion 31 and the body portion 41 are inserted into the circuit board 20, the support portion 31 and the body portion 41 may be inserted to be perpendicular to the circuit board 20.

The ground electrode 30 and the high voltage electrode 40 may be vertically inserted into the circuit board 20.

Ends of the ground electrode 30 and the high voltage electrode 40 may be located at the same height.

In more detail, a position of an edge 42*a*, which is a portion at which the tip portion 42 terminates, may be located at the same height as an upper extension line h1, which is an extension line of an upper surface of the electrode portion 32.

In addition, the position of the edge 42*a* may be located between a height of a lower extension line h2, which is an extension line of a lower surface of the electrode portion 32, and the height of the upper extension line h1. Here, a vertical distance from the edge 42*a* to the upper extension line h1 may be 0.5 mm.

The edge 42*a* may be located at a higher position than the upper extension line h1. Here, a vertical distance from the edge 42*a* to the upper extension line h1 may be 1 mm.

Hereinafter, a diameter design size of the tip portion 42 will be described with reference to FIGS. 4 and 5.

A diameter D of the tip portion 42 may affect the concentration of ions generated by the ion generator. The diameter D of the tip portion 42 refers to a diameter of the high voltage electrode 40 at a position 5 μm away from the edge 42*a* of the tip portion 42 of the high voltage electrode (see (a) of FIG. 5).

The concentration of generated ions exhibits no significant difference between when a diameter of the tip portion 42 is less than 10 μm and when a diameter of the tip portion 42 is 10 μm, but the concentration of generated ions is drastically decreased when a diameter of the tip portion 42 is greater than 10 μm.

The intensity of plasma discharge increases as the diameter of the tip portion 42 decreases, allowing more ions to be generated. However, this may cause an increase in manufacturing cost. Thus, the diameter of the tip portion 42 may be in the range greater than or equal to 7 μm and less than or equal to 13 μm.

Hereinafter, a method of coupling assemblies 60 and 70, each of which is assembled with the holder kit 50 by which the ground electrode 30 and the high voltage electrode 40 are integrated to each other, to the circuit board 20 will be described with reference to FIGS. 6 and 7.

The ground electrode 30 and the high voltage electrode 40 may be inserted into the holder kit 50, as described above, to form an integrated assembly (60, 70).

The assemblies 60 and 70 may be classified into an anode (or positive electrode) assembly 60 and a cathode (or negative electrode) assembly 70 according to an installation position on the circuit board 20.

Ends of the ground electrodes 30 inserted into the respective assemblies 60 and 70 may protrude from the bottom surface of the holder kit 50 to be inserted into the respective ground electrode insertion holes 31*a* formed in the circuit board 20, and ends of the high voltage electrodes 40 may protrude from the bottom surface of the holder kit 50 to be inserted into the respective high voltage electrode insertion holes 41*a* formed in the circuit board 20.

After the assemblies 60 and 70 are assembled to the circuit board 20, the ends of the high voltage electrodes 40 may respectively be in contact with high voltage patterns 22 and 23 printed on a lower surface of the circuit board 20 to receive a high voltage. The ends of the ground electrodes 30 may be in contact with a ground pattern 24 printed on an upper surface of the circuit board 20 to define a ground portion of a circuit printed on the circuit board 20.

The circuit board 20 may be supplied with power by a power supplier (not shown) that is connected to a high voltage terminal 21, and may boost power supplied through a high voltage transformer 25 to apply the power through the high voltage patterns 22 and 23.

The ground pattern 24 may be divided into a first ground pattern 24*a* directly printed on the upper surface of the circuit board 20 and a second ground pattern 24*b* printed on an upper portion of the first ground pattern 24*a*.

A case connecting hole 26 may be formed at a corner of the circuit board 20, and the circuit board 20 may be fastened to the case 80 by a fastening member (not shown) that passes through the case connecting hole 26.

Hereinafter, the principle of an ion generator will be described with reference to FIGS. 8 and 9.

Referring to FIG. 8, the ion generator I may include a power input connector 21 that receives power from the outside, a high voltage transformer 25 that converts a voltage of the power to a high voltage, and high voltage circuits 22 and 23 that apply power to the high voltage electrode 40.

The power input connector 21 may be exposed to the outside of the case 80 (or the circuit board 20) to be connected to an external power source. The power input connector 21 may be electrically connected to a primary side of the high voltage transformer 25.

The high voltage transformer 25 may boost a voltage input to the primary side thereof and may then output the voltage to a secondary side thereof. One end of the secondary side of the high voltage transformer 25 may be electrically connected to the ground electrode 30, and another end of the secondary side of the high voltage transformer 25 may be connected to the high voltage electrode 40 through the high voltage circuits 22 and 23.

The high voltage electrode 40 may include a first high voltage electrode 40*a* and a second high voltage electrode 40*b*, and the ground electrode 30 may include a first ground electrode 30*a* and a second ground electrode 30*b* that are opposite the first high voltage electrode 40*a* and the second high voltage electrode 40*b*, respectively. The first and second ground electrodes 30*a* and 30*b* may have the same potential.

The another end of the secondary side of the high voltage transformer 25 may be electrically connected to the first high voltage electrode 40*a* through a first high voltage circuit 22 (positive (+) high voltage circuit). At the same time, the another end of the secondary side of the high voltage transformer 25 may be electrically connected to the second high voltage electrode 40*b* through a second high voltage circuit 23 (negative (−) high voltage circuit). Accordingly, the ion generator I may produce both positive and negative ions.

When a plasma discharge occurs between the high voltage electrode 40 and the ground electrode 30, molecules in air are ionized. The ionized molecules may charge dust contained in the air to improve the efficiency of dust collection. In addition, the ionized molecules may also kill microorganisms contained in the air. Further, the ionized molecules may be combined with molecules that cause odor to thereby obtain the deodorizing effect.

As a positive high voltage is applied to the first high voltage electrode 40*a*, a positive plasma discharge may be generated in the tip portion 42 of the first high voltage electrode 40*a*, thereby producing positive ions or cations. As a negative high voltage is applied to the second high voltage electrode 40*b*, a negative plasma discharge may be generated in the tip portion 42 of the second high voltage electrode 40*b*, thereby producing negative ions or anions.

Referring to FIG. 9, ions produced in the ion generator I may form cluster ions combined with a plurality of water molecules. When a positive high voltage is applied to the high voltage electrode 40, hydrogen cations ($H^+$) may be produced, and the hydrogen cations may bond with surrounding water molecules to form a cation cluster. When a negative high voltage is applied to the high voltage electrode 40, oxygen anions ($O_2^-$) may be produced, and the oxygen anions may bond with surrounding water molecules to form an anion cluster.

(a) of FIG. 9 is a graph showing the mass number of a cation cluster, and (b) of FIG. 9 is a graph showing the mass number of an anion cluster. Referring to (a) and (b) of FIG. 9, when measuring the mass number of an ion cluster, a peak value is measured in a multiple of 18, which is the mass number of a water molecule. This is because, to be known, as shown in (c) of FIG. 9, cations ($H^+$) combined with a plurality of water molecules form a cation cluster ($H^+(H_2O)_m$, m is a natural number), and anions ($O_2^-$) combined with a plurality of water molecules form an anion cluster ($O_2^-(H_2O)_n$, n is a natural number).

Cations and anions, which are highly reactive and unstable, are neutralized without diffusing far or widely. However, when ions form an ion cluster, the ion cluster may diffuse more widely as the ion cluster is relatively stable, thereby combining with more dust, bacteria and/or odor-causing molecules.

Hereinafter, a manufacturing process of the circuit board 20 according to an embodiment of the present disclosure will be described with reference to FIGS. 10 and 11.

The circuit board 20 used in the embodiment of the present disclosure may be a PCB substrate.

The manufacturing process may be mainly divided into a preparation step (S100), a first pattern forming step (S200), a second pattern forming step (S300), and a completion step (S400).

In the preparation step (S100), washing or cleaning may be performed after searching for a PCB substrate and a screen on which the high voltage patterns 22 and 23 are printed.

In the first pattern forming step (S200), a step of material searching (S210) and a step of material washing (S220) the same operation as that performed in the preparation step S100 may be repeated to proceed to a step of PSR printing (S230).

In the step of PSR printing (S230), a PSR material may be poured on the prepared PCB substrate at a position desired for the pattern formation (see FIG. 7) to form the first ground pattern 24*a*.

In the step of drying and curing (S240), the PSR material may be dried at approximately 150° C. and may then be cured for 2 hours or longer.

In a step of printed state checking (S250), a state or condition of the PSR material being printed on the PCB substrate may be checked. When the printed state is poor, a series of these processes may be repeated, starting from the step of material searching (S210).

When the printed state is determined as good in the step of printed state checking (S250), the second pattern forming step (S300) may be carried out. In a step of conductive material printing (S310), a conductive material may be poured onto a position desired for the pattern formation (see FIG. 7) to form the second ground pattern 24*b*. The position may be on an upper side of the first ground pattern 24*a*.

Here, a material, such as Ag, Carbon, and CNT Paste, may be used as the conductive material.

In a step of drying and curing (S320), the conductive material may be dried at approximately 150° C. and may then be cured for 2 hours or longer.

In a step of printed state checking (S330), a state or condition of the conductive material being printed on the PCB substrate may be checked. When the printed state is poor, a series of these processes may be repeated, starting from the step of material searching (S210).

In the completion step (S400), the assemblies 60 and 70 may be installed to the PCB substrate on which the high voltage patterns 22 and 23, and the ground pattern 24 are formed.

The ground pattern 24 formed through the first pattern forming step (S200) and the second pattern forming step (S300) is in contact with the ground electrodes 30 of the assemblies 60 and 70 to define a ground portion of a circuit, and the ground pattern 24 may be printed on the upper surface of the circuit board 20 so as not to interfere with the high voltage patterns 22 and 23 printed on the lower surface of the circuit board 20.

The ground pattern 24 and the high voltage patterns 22 and 23 printed on the upper and lower surfaces of the circuit board 20, respectively, may not require (or exclude) an electric wire for the circuit configuration, poor contact caused by shaking of the electric wire may be solved or prevented.

Referring to FIG. 12, the ion generator I according to an embodiment of the present disclosure may be applied to an air conditioner, an air purifier 10, or a sterilizer.

The air purifier 10 may include a blower fan 11, so that air introduced through an inlet 12 may be filtered to remove foreign substances from the air inside the air purifier 10 to be discharged through an outlet 13 when the blower fan 11 is operated.

The air purifier 10 may include a dust collector 14 that collects foreign substances contained in air, and the ion generator I that charges the foreign substances. The ion generator I, the dust collector 14, and the blower fan 11 may be sequentially installed in the air purifier 10 in a direction from the inlet 12 to the outlet 13. The ion generator I may charge dust to improve the efficiency of dust collection, and may remove bacteria and odor-causing molecules.

Meanwhile, a heat exchanger 15 may be installed at the air purifier 10 to configure an air conditioner capable of heating and cooling. In such an air conditioner, the ion generator I, the dust collector 14, the heat exchanger 15, and the blower fan 11 may be sequentially installed in a direction from the inlet 12 to the outlet 13.

Although preferred embodiments of the present disclosure have been shown and described herein, the present disclosure is not limited to the specific embodiments described above. It will be understood that various modifications and changes can be made by those skilled in the art without departing from the idea and scope of the present disclosure as defined by the appended claims. Therefore, it shall be considered that such modifications, changes, and equivalents thereof are all included within the scope of the present disclosure.

The invention claimed is:

1. An ion generator comprising:

a circuit board comprising an electric circuit;

a needle electrode connected to the electric circuit and configured to receive a voltage applied from the electric circuit;

a ground electrode connected to the electric circuit and spaced apart from the needle electrode; and a holder kit including:

a first insertion groove that receives the needle electrode, and a second insertion groove that is spaced apart from the first insertion groove and receives the ground electrode, the second insertion groove extending in a vertical direction with respect to the circuit board, wherein the ground electrode comprises:

a support portion that is inserted into the second insertion groove and the circuit board, and an electrode portion that extends from an upper end of the support portion and has an arcuate shape.

2. The ion generator of claim 1, wherein the holder kit comprises a flat surface that defines a through-hole, wherein the first insertion groove extends downward from the through-hole, and wherein the needle electrode passes through the through-hole and is in contact with a peripheral portion of the first insertion groove.

3. The ion generator of claim 2, wherein the holder kit further comprises an inclined surface that is inclined with respect to the flat surface and extends toward an outside of the holder kit, and wherein the holder kit defines a space surrounded by the inclined surface.

4. The ion generator of claim 1, wherein the holder kit comprises a rim that has a ring shape and defines an upper end of the holder kit, and wherein the electrode portion is inserted into the rim and in contact with an inner circumferential surface of the rim.

5. The ion generator of claim 4, wherein the holder kit further comprises a seating surface that is recessed from the rim and supports the electrode portion, and wherein the electrode portion is in contact with the seating surface.

6. The ion generator of claim 4, wherein the rim defines a circumferential gap, and wherein the second insertion groove extends downward from the circumferential gap.

7. The ion generator of claim 1, wherein the electrode portion is symmetrical with respect to a plane passing through the support portion.

8. The ion generator of claim 1, wherein the support portion and the needle electrode are vertically disposed with respect to the circuit board, and wherein the electrode portion is disposed at a height corresponding to an upper end of the needle electrode.

9. The ion generator of claim 1, wherein the support portion and the needle electrode are vertically disposed with respect to the circuit board, and wherein an upper end of the needle electrode is located between (i) a first position that is 1 mm higher than an upper surface of the electrode portion and (ii) a second position that is 0.5 mm lower than the upper surface of the electrode portion.

10. The ion generator of claim 1, wherein the needle electrode comprises a tip portion that defines an upper end of the needle electrode, and wherein the tip portion is located at a center of the electrode portion.

11. The ion generator of claim 10, wherein a diameter of the tip portion is greater than or equal to 7 μm and less than or equal to 13 μm.

12. The ion generator of claim 10, wherein a distance between the tip portion and the electrode portion is greater than or equal to 8 mm and less than or equal to 10 mm.

13. The ion generator of claim 1, wherein the electrical circuit comprises:

a voltage transformer configured to increase the voltage; and a plurality of patterns that are printed on the circuit board, the plurality of patterns comprising:

a voltage pattern configured to apply the voltage to the needle electrode; and a ground pattern that defines a ground of the electric circuit.

14. The ion generator of claim 13, wherein the voltage pattern is printed on a lower surface of the circuit board, and wherein the ground pattern is printed on an upper surface of the circuit board.

15. The ion generator of claim 14, wherein the ground pattern comprises:

a first ground pattern printed on the upper surface of the circuit board; and a second ground pattern printed on an upper side of the first ground pattern.

16. The ion generator of claim 15, wherein a width of the first ground pattern is greater than a width of the second ground pattern.

17. The ion generator of claim 1, further comprising a case that is coupled to the circuit board and accommodates the holder kit, the case defining a communication hole that faces the needle electrode.

18. The ion generator of claim 1, wherein the holder kit has a cylindrical shape, wherein the first insertion groove extends in the vertical direction through a center of the cylindrical shape, and wherein the second insertion groove is recessed radially inward from an outer circumferential surface of the cylindrical shape.

19. An ion generator comprising:

a circuit board comprising an electric circuit;

a needle electrode connected to the electric circuit and configured to receive a voltage applied from the electric circuit;

a ground electrode connected to the electric circuit and spaced apart from the needle electrode; and a holder kit including:

a first insertion groove that receives the needle electrode, and a second insertion groove that is spaced apart from the first insertion groove and receives the ground electrode, the second insertion groove extending in a vertical direction with respect to the circuit board, wherein the circuit board defines:

a ground electrode insertion hole that receives an end of the ground electrode, and a needle electrode insertion hole that receives an end of the needle electrode.

20. An ion generator comprising:

a circuit board comprising an electric circuit;

a needle electrode connected to the electric circuit and configured to receive a voltage applied from the electric circuit;

a ground electrode connected to the electric circuit and spaced apart from the needle electrode; and a holder kit including:

a first insertion groove that receives the needle electrode, and a second insertion groove that is spaced apart from the first insertion groove and receives the ground electrode, the second insertion groove extending in a vertical direction with respect to the circuit board, wherein the holder kit has a cylindrical shape, wherein the first insertion groove extends in the vertical direction through a center of the cylindrical shape, and wherein the second insertion groove is recessed radially inward from an outer circumferential surface of the cylindrical shape.

* * * * *